United States Patent [19]

Buehler et al.

[11] Patent Number: 5,143,883
[45] Date of Patent: * Sep. 1, 1992

[54] MODIFIED SILICA BASED CATALYST

[75] Inventors: Charles K. Buehler, Naperville; Richard W. Fries, Joliet; Thomas J. Pullukat, Hoffman Estates, all of Ill.

[73] Assignee: Quantum Chemical Corporation, New York, N.Y.

[*] Notice: The portion of the term of this patent subsequent to Aug. 21, 2007 has been disclaimed.

[21] Appl. No.: 590,992

[22] Filed: Oct. 1, 1990

Related U.S. Application Data

[63] Continuation of Ser. No. 435,495, Jul. 11, 1989, abandoned, which is a continuation-in-part of Ser. No. 99,190, Sep. 21, 1987, abandoned.

[51] Int. Cl.$^5$ ............................................. C08F 4/654
[52] U.S. Cl. .................................. 502/119; 502/120; 526/119
[58] Field of Search .............................. 502/119, 120

[56] References Cited

U.S. PATENT DOCUMENTS

| | | | |
|---|---|---|---|
| 3,135,809 | 6/1964 | Bosmajian | 260/650 |
| 3,591,656 | 6/1971 | Kroll | 260/683.9 |
| 4,156,063 | 5/1979 | Giannini et al. | 526/114 |
| 4,220,554 | 9/1980 | Scata et al. | 252/429 B |
| 4,226,741 | 10/1980 | Luciani et al. | 252/429 B |
| 4,298,718 | 11/1981 | Mayr et al. | 526/125 |
| 4,390,454 | 6/1983 | Cuffiani et al. | 252/429 B |
| 4,495,338 | 1/1985 | Mayr et al. | 502/125 |
| 4,508,843 | 4/1985 | Etherton et al. | 502/115 |
| 4,526,941 | 7/1985 | Sakurai et al. | 526/127 |
| 4,530,913 | 7/1985 | Pullukat et al. | 502/104 |
| 4,565,795 | 1/1986 | Short et al. | 502/110 |
| 4,595,735 | 6/1986 | Nomura et al. | 526/125 |
| 4,612,299 | 9/1986 | Arzoumanidis et al. | 502/104 |
| 4,647,550 | 3/1987 | Kohora et al. | 502/115 |
| 4,686,199 | 8/1987 | Tachikawa et al. | 502/104 |
| 4,738,942 | 4/1988 | Nowlin | 502/104 |
| 4,743,665 | 5/1988 | Sasaki et al. | 526/119 |
| 4,849,483 | 7/1989 | Tachikawa et al. | 526/97 |
| 4,916,099 | 4/1990 | Sasaki et al. | 502/126 |
| 4,950,631 | 8/1990 | Buehler et al. | 502/119 |

FOREIGN PATENT DOCUMENTS

| | | |
|---|---|---|
| 0206172 | 12/1986 | European Pat. Off. |
| 0244678 | 11/1987 | European Pat. Off. |
| 58-162607 | 9/1983 | Japan |
| 62-124105 | 6/1987 | Japan |
| 2184448 | 6/1987 | United Kingdom |

OTHER PUBLICATIONS

Ser. No. 498,308 Buehler (pending) Mar. 23, 1990.
Ser. No. 569,688 Buehler et al. (pending) Aug. 20, 1990.

Primary Examiner—Patrick P. Garvin
Attorney, Agent, or Firm—Kenneth D. Tremain; Richard G. Jackson

[57] ABSTRACT

The present invention relates to a silica supported magnesium-containing catalytic precursor of reduced SiOH content for reaction with a titanium halide to form a catalyst for the production of a stereospecific alpha olefin polymer characterized in that prior to reacting with titanium halide the magnesium-containing silica is reacted with at least one titanium compound having the formula $Ti(R)_nX_m$ or $Ti(OR)_nX_m$ where R is aryl, alkyl, alkaryl, or mixtures thereof; X is halogen; n is an integer of 1 to 4, and m is 0 or an integer of 1 to 3 with the provision that the sum of n and m is 4. It also relates to preparing the catalyst from the precursor.

10 Claims, No Drawings

MODIFIED SILICA BASED CATALYST

This is a continuation of Ser. No. 435,495 filed Jul. 11, 1989, now abandoned, which is a continuation-in-part of Ser. No. 99,190 filed Sept. 21, 1987, now abandoned.

BACKGROUND OF THE DISCLOSURE

1. Field of the Invention

The instant invention is directed to a high activity supported catalyst useful in the production of polypropylene of relatively high powder bulk density, high isotacticity and narrow particle size distribution. More particularly, the instant invention is directed to a catalyst, useful in the polymerization of olefins such as propylene to stereoregular olefin polymers, wherein a silica support is modified and thereafter treated with magnesium and titanium compounds.

2. Background of the Prior Art

The polymerization of olefins using Ziegler-Natta catalysts is widely utilized. These catalysts provide polyolefins in high yield possessing the desired characteristics of these polymers. However, the use of these conventional catalysts are subject to important failings. Thus, new and improved catalysts are continually being sought. An important class of catalysts where improvement is sought is the very commercially important alpha-olefin, propylene.

Commonly in the polymerization of propylene a catalyst having a magnesium halide support is utilized. However, when polypropylene polymerized from a magnesium halide supported catalyst is processed into molded products, the polypropylene molding machine processing this polymer is subjected to corrosion. This corrosion is caused by the residual presence of magnesium halide in the polypropylene product. The adverse effect of this corrosion is not limited to damaging expensive molding machinery. More importantly, the polypropylene molded article processed in this equipment is characterized by aesthetic flaws.

Another detrimental property of catalysts, conventionally used in the polymerization of propylene polymers, involves the characteristic in many propylene catalysts of the prior art that they incorporate internal electron donors to insure that the propylene polymer product is highly isotactic. Those skilled in the art are aware of the criticality of stereoregularity in propylene polymers. However, those skilled in the art are also aware that the presence of internal electron donors creates difficulties. Unless the amount and type of electron donor compound is carefully selected not only is the stereoregularity of the resultant polymer deficient but poor catalytic activity often results. This detrimental effect still occurs if the catalyst is formed with the proper electron donor compound added in the wrong sequence.

The utilization of electron donor compounds often creates additional problems involving offensive odors in the final polymeric product. This unfortunate result obtains even if the ideal electron donor compound, in the correct concentration, added at the proper time in the catalyst formation process, is utilized. Thus, polymers formed from catalysts which include an electron donor compound must oftentimes be deashed or deodorized in order to insure that the final product gives off no odor.

The difficulties discussed above have spurred workers skilled in this art to develop new catalysts which attempt to overcome these difficulties. In one such attempt at eliminating the problem created by halogen-containing carriers, inorganic oxides, such as silica, were proposed as a support. This carrier, containing no halogen, was reacted with a magnesium dialkoxide and an electron donor, such as a carboxylic acid monoester, and a titanium halide compound. This catalyst is described in Japanese Patent Publication 162,607/1983.

Even if the allegations made in this disclosure of high catalytic activity, production of a highly stereospecific polymer having a high bulk density and narrow particle size distribution were correct, the problems associated with odor are not addressed by the use of this catalyst. However, testing of this catalyst establishes that the catalyst provides low activity and that the polymer product is characterized by insufficient stereoregularity and poor particle size distribution.

A more recent disclosure, U.S. Pat. No. 4,595,735, provides a catalytic component for the polymerization of olefins prepared by contacting a magnesium alkoxide, a halogenated hydrocarbon, a halogenated silane and a titanium compound. It is emphasized that this catalyst, useful in the polymerization of ethylene homopolymers and copolymers, incorporates a halogenated hydrocarbon. This catalyst is not only principally directed to the polymerization of ethylene polymers but, significantly, emphasizes the formation of high melt index polymers. Those skilled in the art are aware of the necessity for commercially useful polypropylene to possess low melt flow rates. That is, the molecular weight of the polymers produced in accordance with the '735 catalyst is significantly lower than that required of polypropylene.

U.S. Pat. No. 4,565,795 sets forth an olefin polymerization catalyst which is prepared by the reaction of a chemically treated silica support with a dihydrocarbyl magnesium compound and a halogenated tetravalent titanium compound. The chemical treatment of the silica support involves the use of a chlorinating compound, an alkanol, a silylating compound, an acid chloride or an organoboron compound. Again, this catalyst includes constituents which are adverse to the production of stereoregular polymers, especially polypropylene. It is thus not surprising that this catalyst is suggested for use in the polymerization of ethylene polymers.

U.S. Pat. No. 4,530,913 to Pullukat, et al. describes a method of making a solid polymerization catalytic component by reacting a support (obtained by reacting silica with a halogen-free monofunctional silylating compound) with an organomagnesium compound and a tetravalent titanium compound. The patent shows only data for ethylene polymerization.

The above remarks make clear the continuing need in the art for a new polypropylene catalyst having the desirable properties enumerated above. They also establish that the recent prior art has not met that need.

BRIEF SUMMARY OF THE INVENTION

The present invention is directed to a catalytic precursor and the catalyst for one or more olefins providing stereospecific products such as propylene, butene-1, 3-methyl butene-1, 4-methyl pentene-1 and the like which, when employed in polymerization reactions, produce homopolymers and copolymers of high stereoregularity. The propylene polymer product of polymerization reactions using the catalyst of this invention is characterized by uniform particle size distribution, good spherical morphology and high bulk density. These polypropylene characteristics enhance the production rate and processability of the polymer. In addition, the catalyst is itself highly active, resulting in high polymer productivity as manifested by weight of polymer per unit weight of catalyst.

The catalyst of this invention is also characterized by safe and easy preparation. Unlike magnesium halide supported catalysts expensive ballmilling is not required. Neither is other expensive prepolymerization steps required of magnesium halide supported catalysts. Because the catalyst includes no halogen in the support, the product polymer has low halogen content, significantly reducing the problems of corrosion oftentimes encountered in the processing of such polymers. Moreover, because the catalyst retains low residual metal content, no deashing of the polymer product is required. Finally, the polymerization reaction utilizing this catalyst is enhanced due to its relative constant activity over long periods of time. Finally, the use of the subject catalyst allows for easy control of polymer molecular weight with the judicious addition of hydrogen.

The present invention relates to a silica supported magnesium-containing catalytic precursor of reduced SiOH content for reaction with a titanium halide to form a catalyst for the production of a stereospecific alpha olefin polymer characterized in that prior to reacting with titanium halide the magnesium-containing silica is reacted with at least one titanium compound having the formula Ti(R)$_n$X$_m$ or Ti(OR)$_n$X$_m$ where R is aryl, alkyl, alkaryl or mixtures thereof; X is halogen; n is an integer of 1 to 4, and m is 0 or an integer of 1 to 3 with the provision that the sum of n and m is 4. It also relates to preparing the catalyst from the precursor. More particularly, the invention relates to a supported catalyst for the polymerization of olefins to stereospecific polymers obtainable by reacting a modified silica support having a selective distribution of reactive hydroxyl groups with a magnesium compound reactive with said surface hydroxyl groups, optionally reacting the thus obtained product with a silicon halide, alkyl silicon halide, boron halide or aluminum halide, further reacting the so-produced first material with a tetra-substituted organo halogen-free titanium compound wherein the organic moiety sterically hinders accessability of said organo titanium compound to the reactive sites on the modified silica support and thereafter reacting the so-produced second material with a titanium halide. More specifically, the catalyst comprises the product obtained by pretreating silica preferably by contacting it with a modifying compound selected from the group consisting of silicon halides, alkyl silicon halides, hexaalkyl disilazanes and mixtures thereof, to remove or displace a portion of the surface hydroxyl (or silanol) groups converting them to an

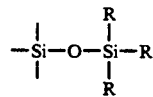

structure and providing a modified surface of controllable reactivity and chemical geometry. In addition, it may be beneficial to further react the support with other modifying compounds such as boron halides, aluminum halides or silicon halides to further remove silanol groups on the silica surface. Contact with the one or more modifying compounds and silica usually occurs at a temperature in the range of between about 0° C. and about 100° C. over a time period of between about 30 minutes and about 2 hours, more preferably for 45 minutes to 1½ hours at a temperature in the range of 50-75° C.

The modified silica support is thereafter treated with at least one hydrocarbon soluble magnesium compound which reacts with the support to provide regularly organized populations of modified molecular groupings, e.g., without limitation

MgOR, and where applicable

MgCl, or

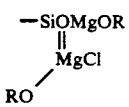

surface groups.

The magnesium-containing modified silica support is further contacted with an organo titanium-containing compound having the structural formula Ti(R)$_n$X$_m$ and especially Ti(OR)$_n$X$_m$, where R is aryl, alkyl, alkaryl or mixtures thereof; X is halogen; n is an integer of 1 to 4; and m is 0 or an integer of 1 to 3 with the proviso that the sum of n and m is 4. The magnesium and titanium-containing modified silica support is then treated with a titanium-containing compound having the structural formula TiX$^1_p$(OR$^1$)$_q$ where X$^1$ is halogen; R$^1$ is aryl or alkyl; p is an integer of 1 to 4; and q is 0 or an integer of 1 to 3 with the proviso that the sum of p and q is 4.

In another aspect of the present invention a representative process for polymerizing or copolymerizing olefins providing stereospecific polymers such as propylene is disclosed. In this process propylene is polymerized under propylene polymerization conditions utilizing the catalyst of the present invention. In addition, a first co-catalyst, an aluminum-containing compound, and a second co-catalyst, a hydrocarbyl alkoxysilane, is employed.

DETAILED DESCRIPTION

The catalyst of the present invention is prepared by first modifying the surface of silica, which acts as a carrier, to replace hydroxyl groups with a surface whose structural formula is defined in part by

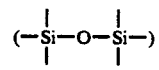

groupings.

Surface modification to provide a controllable population of surface hydroxyl can be effected by calcining the silica in an inert atmosphere, preferably, at a temperature of at least 200° C. More preferably, the calcining treatment involves calcining the silica at a temperature in the range of between about 550° C. and about 650° C. in an inert atmosphere, preferably a nitrogen atmosphere. However, the so-modified support is susceptible of ready resorption of moisture and reconstitution of its original form, hence must be carefully handled.

In a preferred and representative embodiment, the removal of surface hydroxyl groups is accomplished by treating the silica with a monofunctional organic silicon compound such as an alkyl disilazane. Examples of these compounds have the following structures: $(R_3Si)_2NH$, $R_3Si(OR)$, $R_3SiX$ and $(R_3Si)_2O$ where R is alkyl or aryl, preferably each containing 1 to 20 carbon atoms, and X is halogen. Specific examples are hexamethyl disilazane, trialkylsilyl ethoxide, alkyl chlorosilanes, etc. The reaction of silica with the organosilicon compound can be done in any convenient way, i.e., in solution, direct liquid-solid reaction, vapor phase reaction, etc. In the reaction of the organosilicon compounds with silica or alumina an excess of the organosilicon compounds is used to facilitate a complete reaction. After the reaction of silica or alumina with the organosilicon compound, it should not be thermally treated but should be stripped of any excess organosilicon compound and by-products of the reaction by vacuum suction, solvent washing in which the preferred solvent is a liquid hydrocarbon or by purging with a gas. This can be done at a temperature between ambient and about 200° C. Of the hexaalkyl disilazanes useful in this application, hexamethyl disilazane is preferred. Such treatment is disclosed and claimed in U.S. Pat. No. 4,530,913 of Pullukat, et al., incorporated herein by reference.

The silica, whose surface is modified as described above, is preferably defined by a surface area in the range of between about 80 and about 400 square meters per gram, median particle size of about 20 to about 200 microns and a pore volume of between about 0.6 to about 3.0 cc/gram. It comprises a surface subpopulation of unreacted free hydroxyl as well as

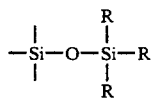

groupings, in which the R group
represents the residue of the modifying agent, in the case of hexamethyl disilazane typically -CH$_3$, NH$_3$ having been liberated during the reaction. It will be understood that the reactivity and molecular dimension of the modifying agent can be important in establishing the arrangement of the surface landscape, in that the unreacted free hydroxyl and the

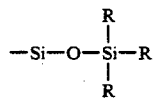

groups are naturally arranged in a somewhat ordered configuration believed to contribute to the performance of the completed catalyst especially in regulation of the provision of polypropylene of high stereoregularity.

The silica employed in the catalyst of the subject invention is preferably pure but may contain minor amounts of other inorganic oxides such as alumina, titania, zirconia, magnesia and the like. In general, the silica support comprises at least 90% by weight pure silica. More preferably, the weight percentage of pure silica is at least 95%. Most preferably, the weight percentage of pure silica is at least 99%.

Contact between the one or more modifying compounds and silica usually occur at a temperature in the range of between about 0° C. and about 100° C. over a time period of between about 30 minutes and about 2 hours. More preferably, this contact occurs over a period of 45 minutes and 1½ hours at a temperature in the range of between about 0° C. and about 75° C.

The modified silica support is also contacted with a hydrocarbon soluble magnesium-containing compound, preferably an alkoxy magnesium chloride in an inert hydrocarbon solvent. Hydrocarbon soluble magnesium compounds that can be used in the preparation of the catalyst of this invention include hydrocarbyloxy magnesiums, hydrocarbyloxymagnesium halides and mixtures thereof. Preferably, the magnesium compounds are magnesium alkoxides, alkoxymagnesium halides and mixtures thereof. Especially preferred magnesium compounds contemplated for use in the catalyst formation of the present invention include 2-methylpentoxymagnesium chloride, pentoxymagnesium chloride, di-2-ethylhexyloxymagnesium, di-2-methyl pentoxy magnesium and mixtures thereof. Generally, higher, e.g., C$_5$ and above up to about C$_{20}$, hydrocarbyl substitution is preferred to assure adequate performance including hydrocarbon solubility. One may also employ such compounds as
butyl magnesium silylamide

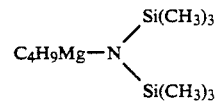

employing a hydrocarbyl magnesium moiety linked to at least one functionality reactive with the surface hydroxyl of the support.

The reaction between the silica support and the soluble magnesium compound or compounds usually occurs at a temperature in the range of between about 0° C. and about 160° C. More preferably, this reaction occurs at a temperature in the range of between about 50° C. and 150° C. Most preferably, the reaction occurs at a temperature in the range of between about 60° C. and about 150° C. The reaction occurs over a period of between about 5 minutes and 6 hours. More preferably, the reaction occurs over a period of between about 45 minutes and 3 hours.

In another preferred embodiment, the reaction takes place in the presence of a minimum level of solvent where the alkoxymagnesium chloride, for example, is dried onto the silica to maximize interaction with the reactive surface groups, then the system was flushed with a large volume of solvent and then optionally reacted with a modifying agent such as a silicon halide, alkyl silicon halide, boron halide or aluminum halide.

Typically, the reaction is conducted with an excess of the magnesium compound relative to the reactive groups on the support, which may contain residual alcohol, or the reaction of which may result in the deposition and absorption of alcohol. It may be desirable in certain preparations to remove unreacted magnesium compound and particularly the alcohol so as to avoid side reactions and undesirable residues in the ensuing reactions. In consequence, it is appropriate to remove these materials by treatment with a component such as a silicon halide, boron halide, aluminum halide, alkyl silicon halide or mixtures thereof. Silicon tetrachloride at 0°-60° C. is perfectly suitable. The support may likewise be treated prior to reaction with the magnesium compound with, e.g., silicon tetrachloride which is absorbed onto the surface and facilitates reaction of the magnesium compound with the surface reactive sites. Thus, the silicon tetrachloride may be introduced where desired either before or after interreaction with the magnesium compound. In referring to washes in the specification and the Examples, generally a portion of an inert solvent such as heptane is added, stirred with the support, and decanted.

In effecting substitution and exchange reactions in relation to the alcohol moieties, it has been found that interreaction with such a modifying agent can effect change in the surface chemistry, i.e., a rearrangement of molecular structure, and the agent can in these cases be selectively employed as of choice for such purposes. While not wishing to be bound by an essentially theoretical elucidation, it is believed from observed evolution of HCl that scavenging of free alcohol is a significant result of interaction with this agent, but that as well substitution and rearrangement at the

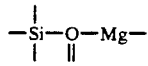

site may also be involved.

The so-reacted magnesium-containing silica support presents a surface reflective of its modification in the first step above-identified, now largely capped with -MgOR groups, etc., as set forth above, in geometrically ordered surface locations. That support is then rendered catalytically active by further reaction with titanium compounds.

To this end, the silica support is contacted with a titanium-containing compound having the structural formula $Ti(OR)_nX_m$ where R is aryl, alkyl or mixtures thereof; X is halogen; n is an integer of 1 to 4; and m is 0 or an integer of 1 to 3 with the proviso that the sum of n and m is 4.

In a preferred embodiment, the titanium-containing compound is one or more of tetrahydrocarbyloxytitaniums, trihydrocarbyloxytitanium halides, dihydrocarbyloxytitanium dihalides and mixtures thereof.

In the most preferred embodiment, the titanium containing compound is a tetravalent titanium compound free of halogen. Thus, the titanium compound is characterized by "n" being 4 and "m" being 0. Consequently, a variety of titanium compounds may be employed and include tetrahydrocarbyl titanium compounds, including tetrahydrocarbyl titanates which are, in present experience, preferred. The hydrocarbyl moiety of the titanium compound includes aliphatic and cycloaliphatic groups, as well as aromatic groups. Exemplary groups include $C_1$-$C_{28}$ alkanes such as isopropyl, octyl, dodecyl, heptadecyl and similar such groups; cycloalkyls of 3-7 carbons, such as cyclobutyl, cyclopentyl, cyclohexyl and similar such groups including alkyl-substituted cycloalkyls; aromatic hydrocarbons such as phenyl, tolyl, xylyl and the like. Particularly preferred hydrocarbyl groups are those which are sterically hindered or strained.

Particularly preferred titanium esters proposed for use in the formation of the catalyst of the subject invention include tetracresyl titanate, titanium tetrastearate, titanium tetrabutoxide, titanium tetranonolate, tetra-2-ethylhexyl titanate, tetraisobutyl titanate, tetra n-propyltitanate, tetraisopropyltitanate and the like or mixtures or oligomers thereof including isomeric mixtures of individual compounds. In general, the longer chain or bulkier organic moiety is preferred for improved stereospecificity in the resulting polymer product.

It is believed that the molecular dimension of the organic moiety of these compounds can be important in the performance of the resulting catalyst in ordering the arrangement and geometric configuration of the catalytic sites on the support in such a manner as to direct the production of desired polymeric species, for example, in relation to stereoregularity, while also admitting the provision of other desired polymer properties in the resulting product. Specifically, organic moieties of larger molecular dimension are preferred which, without limitation, are believed through steric hindrance, straining or other effects to contribute to definition of a catalytic surface effective to provide desirable product properties. Thus, through the combination of a controlled surface reactivity in an attrition resistant support and a geometrically hindered reaction between magnesium and titanium groupings, there is afforded a uniquely effective catalyst without the need to incorporate an internal electron donor.

Best results have been achieved with titanium cresylate and especially the orthoisomer among the commercially available titanium esters, but it is expected that similarly dimensioned and/or shaped organic moieties would be equally suitable provided they are directly bonded to the titanium atom thereby controllably regulating the development of the active catalytic sites at the molecular level.

The reaction between the modified support and the titanium compound occurs at a temperature in the range of between about 0° C. and 120° C. for a period from 5 minutes to 2 hours or more. More preferably, the reaction occurs at a temperature in the range of between about 10° C. and about 100° C. Still more preferably, the reaction takes place at a temperature in the range of between about 10° C. and about 80° C.

The final step in the preparation of the catalyst of this invention involves contacting the catalytic precursor as described with a titanium-containing compound preferably having the structural formula $TiX^1_p(OR^1)_q$ where $X^1$ is halogen, $R^1$ is aryl or alkyl; p is an integer of 1 to 4; and q is 0 or an integer of 1 to 3 with the proviso that the sum of p and q is 4. More preferably, p is an integer of 2 to 4 and q is 0, 1 or 2. In the most preferred embodiments, for the best performance, the catalytic precursor is contacted with the titanium compound promptly, i.e. within a limited time e.g. up to about 20 minutes at room temperature.

Among the titanium-containing compounds within the contemplation of this class are titanium tetrachloride, titanium tetrabromide, methoxytitanium trichloride, ethoxytitanium trichloride, diethoxytitanium dichloride and the like:

Most preferably, p is an integer of 4 and q is 0. That is, most preferably, the titanium compound is a titanium tetrahalide. Of these, titanium tetrachloride is particularly preferred.

The reaction between the silica composition and the titanium halide occurs at a temperature in the range of between about 0° C. and about 150° C. More preferably, the temperature of this reaction is in the range of between about 50° C. and about 120° C. Most preferably, the temperature of this contact is in the range of between about 80° C. and about 100° C.

The titanium compound and the silica composition is reacted for a period in the range of between about 1 hour and 4 hours. More preferably, the reaction occurs over a period of between about 1½ hour and 3½ hours. Most preferably, the time of reaction is between 1 hour and 3 hours.

It should be appreciated that all the treatment steps in the formation of the catalyst of this invention, the reaction of silica with the modifying compound, the hydrocarbon soluble magnesium compound and the two titanium compounds typically involve the reaction between a solid support and a solution. As such, no ball-milling or other solid mixing is required. This expensive and difficult operation, common to the formation of polymerization catalysts of the prior art, is thus eliminated. Those skilled in the art are aware that, in the case where a hydrocarbon solvent is employed, the solvent may be allowed to remain with the reaction mass or can be removed by decantation, filtration or evaporation.

Further observations regarding the above formation steps include the fact that the morphology of the polymer produced from this catalyst emulates that of the support upon which the above-recited reactions occur; that the absence of any halogen in the support aids in keeping the halogen content of the polymer produced therefrom very low; that the relatively low concentrations of titanium and magnesium on the silica support tends to keep the concentration of magnesium and titanium residues in the polymer formed at similarly low levels; that the synthesis of the catalyst occurs at moderate temperature, preferably, in the range of between about 0° C. and 100° C; and that even though this catalyst does not need an electron donor for good isotacticity it is possible to use them if desired. If an election donor is used alkoxysilanes, alkylbenzoates, alkylphthalates or the like is preferred.

Another aspect of the present invention involves the use of the catalyst of the present invention in the polymerization of propylene to produce polypropylene and propylene copolymers. In this process propylene is polymerized under propylene polymerization conditions in the presence of the catalyst of the instant invention.

Present also is a co-catalyst, an aluminum-containing compound. The aluminum compound is preferably an alkylaluminum, an alkylaluminum halide or mixtures thereof. More preferably, the co-catalyst is an aluminum alkyl. Of the aluminum alkyls, triethylaluminum and triisobutylaluminum are particularly preferred.

A second co-catalyst is also employed in the propylene polymerization process of the present invention. The second co-catalyst of this invention is preferably at least one silane compound. Preferably, the silane compound is a hydrocarbyl alkoxysilane. Preferred hydrocarbyl alkoxysilanes include hydrocarbyl trialkoxysilanes, dihydrocarbyl dialkoxysilanes and trihydrocarbyl alkoxysilanes. Of the hydrocarbyl trialkoxysilanes, those preferred involve a hydrocarbyl having the meanings phenyl and $C_1$-$C_6$ alkyl; and a $C_1$-$C_{10}$ trialkoxy. Particularly preferred species include hexyltrimethoxysilane, amyltriethoxysilane and isobutyltrimethoxysilane.

The usual propylene polymerization conditions involve a polymerization temperature in the range of between about 35° C. and about 100° C. More preferably, the temperature of this reaction is in the range of about 50° C. and about 80° C. The pressure of the propylene polymerization reaction is in the range of between about 300 psig and about 600 psig, more preferably, between about 400 psig and about 500 psig. Naturally, although not necessary to the effective use of the catalyst, prepolymerization procedures known to the art can be applied to advantage where desired.

The following examples are given to illustrate the scope of this invention. Because these examples are given for illustrative purposes only, the invention embodied therein should not be limited thereto.

In accordance with the most preferred embodiments, highly isotactic polypropylene (>98% heptane insolubles) of high powder bulk density (>25 lb/ft$^3$) and narrow particle size (200-1,500 microns) can be produced with catalyst yield in excess of 5,000 g polymer/g cat/hr.

EXAMPLE 1

Catalyst Preparation

A catalyst was prepared by introducing 12.5 mmol of silicon tetrachloride and 5.0 g of silica previously calcined in nitrogen at 600° C. in a slurry of 500 ml. heptane into a 3-neck, 250 ml. round bottom flask equipped with a nitrogen purge, a paddle stirrer, a stirring gland, a condenser and a bubbler. This slurry was stirred for one hour at 60° C. The silica utilized in this example had a surface area of 300 m$^2$/g, a median particle size of 80-90 microns and a pore volume of 1.3 cc/g. Thereafter, 12.5 mmol of 2-methylpentyloxymagnesium chloride was added and reacted with the silica slurry for one hour at 70° C. Following this step 3.175 mmol of tetracresyltitanate (derivative of mixed cresol isomers) was added. The titanate was allowed to react with the slurry for one hour at 70° C.

The solid product of these reaction steps was allowed to settle and the supernatant was syphoned off. Fifty ml of fresh heptane was added to the solid and stirred without further heating. The solid was again allowed to settle and the supernatant syphoned off. This washing step was repeated three times until a total of 200 ml. of supernatant was removed. Liquid titanium tetrachloride was added to the washed solid and allowed to react with the solid for two hours at 80° C. to 100° C. with stirring. The solid product of this reaction was washed three times with heptane, as described in the previous washing step, until 300 ml. of supernatant, inclusive of all washings, was removed. The remainder of the solvent was evaporated to produce a salmon-colored, free-flowing spherically-shaped solid catalyst.

EXAMPLE 2

Catalyst Preparation

A catalyst was prepared in accordance with the procedure of Example 1. However, due to minor variations in the washing procedures, set forth in Example 1, the concentration of magnesium and titanium in the final product varied therefrom. Specifically, whereas the concentration of Mg and Ti of the catalyst of Example 1 was 3.49 weight % and 2.56 weight %, respectively, the concentration of Mg and Ti in the catalyst of the present example was 3.60 weight % and 3.90 weight % respectively.

EXAMPLES 3 TO 5

Preparation of Catalysts

Three additional catalysts were prepared in accordance with the procedure of Example 1 except that the 5.0 g of silica was pretreated with hexamethyl disilazane rather than the calcining step of Examples 1 and 2. The modified silica was dried in the reactor for at least 1 hour at 100° C. with agitation and a 2.7 L/min. nitrogen purge. Moreover, the concentration of magnesium, contributed to by the treatment with 2-methylpentyloxymagnesium chloride, and the titanium concentration, provided by tetracresyl titanate and titanium tetrachloride, varied such that the concentration of magnesium in the catalyst of Examples 3, 4 and 5 was 3.60 weight %, 1.92 weight % and 3.10 weight %, respectively, based on the total weight of the final catalyst. Similarly, the weight percent of titanium in the catalysts of Examples 3, 4 and 5 was 3.60%, 1.37% and 2.50%, respectively. These differences were due to minor variations in the washing procedures.

EXAMPLE 6

Propylene Polymerization Utilizing Catalysts of Examples 1-5

Liquid propylene was separately reacted with each of the catalysts of Examples 1 to 5. In addition to 40 mg of the catalyst of each of Examples 1 to 5 two co-catalysts were utilized. These two co-catalysts were triethylaluminum and isobutyltrimethoxysilane (IBTMS). The amounts of the triethylaluminum and IBTMS employed were such that the molar ratio of aluminum to titanium to IBTMS was 40:1:8, respectively. Each propylene polymerization reaction was conducted at a pressure of 460 psig and a temperature of 70° C. In each of these runs, 4.5 mmol of hydrogen was used to control the molecular weight of the propylene homopolymer product.

The results of these polymerizations are summarized in Table 1. It is noted that the polymerization reaction time was one hour in each case except for the polymerization of the catalyst of Example 3 wherein two runs were employed utilizing one and two hour reaction times. Moreover, the one hour polymerizations involving the catalysts of Examples 2 and 5 were repeated 2 and 3 times, respectively. These runs, and the results thereof, are summarized in Table 1.

EXAMPLE 7

A. Catalyst Preparation

A catalyst was prepared by pretreating silica (Davison 948, having a surface area of 300 m$^2$/g, a median particle size of 80–90 microns and a pore volume of 1.3 cc/g) with 12.5 mmol of hexamethyl disilazane per gram of silica which was then dried in the reactor for in excess of 4 hours at 100° C. with agitation under 2.7 L/min. nitrogen purge.

The modified support was introduced into a 3-neck, 250 ml round bottom flask equipped with a nitrogen purge, a paddle stirrer, a stirring gland, a condenser and a bubbler. Then 2.5 mmol of 2-methylpentyloxymagnesium chloride g/SiO$_2$ was added, reacted with the silica slurry at 20° C. then dried at 40–115° C. in the reactor with stirring for two hours under a nitrogen purge at 2.7 L/min.

The resulting dried solid was then contacted with 10 ml heptane/g silica and 2.5 mmol of silicon tetrachloride/g silica for a period of 1 hour at 40° C. The material was then washed twice with 7.8 ml heptane/g silica with stirring for 3 minutes, and the supernatant siphoned off after the solid settled at the conclusion of each wash.

The so modified and washed catalytic precursor was then reacted with 0.6 mmol of titanium cresylate/g silica for 5 minutes at 30° C. followed by reaction with 18 mmol titanium tetrachloride/g silica at 100° C. for 2 hours and then washed for five times as described above.

Variations in these preparatory procedures may be employed to advantage in controlling catalytic activity and polymer properties. For example, incomplete drying can reduce productivity and polymer bulk density whereas longer drying times or too high an initial drying temperature can result in a decrease of catalytic activity. Generally, drying after reaction with the magnesium compound is conducted at 70–80° C. for a period of 1½ to 2½ hours.

B. Polymerization

The recovered catalyst was employed in the polymerization of propylene employing 40 mg of catalyst and co-catalysts triethylaluminum and isobutyltrimethoxysilane (IBTMS). The amounts of the triethylaluminum and IBTMS employed were such that the molar ratio of aluminum to titanium to IBTMS was 40:1:8, respectively. Each propylene polymerization reaction was conducted at a pressure of 460 psig and a temperature of 70° C. for a reaction time of 1 hour. In each of these runs, 4.5 mmol of hydrogen was used to control

TABLE 1

| Catalyst of Example No. | Wt % Ti | Wt % Mg | Reaction Time, hr. | Productivity[a] g PP/g Ti | g PP/g Total Cat. | % HI[b] | MFR[c] |
|---|---|---|---|---|---|---|---|
| 1 | 2.56 | 3.49 | 1 | 200,000 | 4775 | 98.0 | 2.0 |
| 2 | 3.90 | 3.60 | 1 | 143,000 | 4575 | 96.4 | 2.6 |
|   |      |      | 1 | 125,000 | 4110 | 94.4 | 6.6 |
| 3 | 3.60 | 3.60 | 1 | 143,000 | 5000 | 96.0 | 2.0 |
|   |      |      | 2 | 167,000 | 5700 | 94.5 | 2.2 |
| 4 | 1.37 | 1.92 | 1 | 143,000 | 4900 | 95.0 | 2.0 |
| 5 a | 2.50 | 3.10 | 1 | 143,000 | 3450 | 94.0 | 1.4 |
|   b |      |      | 1 | 143,000 | 3500 | 95.3 | 3.0 |
|   c |      |      | 1 | 167,000 | 4625 | 94.9 | 1.5 |

[a]Weight of polypropylene produced per unit weight of catalyst reported on the basis of titanium concentration and total catalyst.
[b]HI - Heptane insolubles
[c]MFR - Melt flow rate as measured by ASTM Test D-1238, Method D.

the molecular weight of the propylene homopolymer product.

The results of runs conducted under the indicated preparation and polymerization conditions are as follows:

of 1.25 mmols of reactive surface hydroxyls on the support. Variation among the examples involved the identity and amount of the modifying compounds. The identity and amount of the modifying compound is reported in Table 3.

TABLE 2

| Run No. | RoMgCl—SiCl₄ Rxn Temp (°C.) | RoMgCl Addition Temp. | RoMgCl Drying Time | TiCl₄ Rxn Temp (°C.) | TiCl₄ Rxn Time (Hrs) | Productivity (g$^{PP}$/g Cat) |
|---|---|---|---|---|---|---|
| 6-1 | 43 | 52 | 1.75 | 91 | 1 | 5686 |
| 6-2 | 41 | 43 | 2.0 | 90 | 1 | 3985 |
| 6-3 | 40 | 32 | 2.0 | 100 | 2 | 4223 |
| 6-4 | 45 | 45 | 2.0 | 89 | 1 | 4886 |
| 6-5 | 43 | 18 | 2.0 | 93 | 2 | 5223 |
| 6-6 | 42 | 26 | 2.0 | 93 | 2 | 5007 |

| Run No. | Bulk Density (lb/Fy³) | Heptane Molecules | MFR | Analytic Data SiO₂ (%) | Mg (%) | Ti (%) | Mg/Ti |
|---|---|---|---|---|---|---|---|
| 6-1 | 24.4 | 97.6 | 4.7 | 61.7 | 3.71 | 2.96 | 2.5 |
| 6-2 | 26.8 | 94.2 | 5.5 | 64.4 | 3.51 | 3.04 | 2.3 |
| 6-3 | 26.7 | — | 12.7 | — | — | — | — |
| 6-4 | 26.3 | 98.7 | 4.4 | 65.1 | 3.71 | 2.96 | 2.4 |
| 6-5 | 25.8 | — | 10.2 | — | — | — | — |
| 6-6 | 23.9 | 98.2 | 9.0 | 61.9 | 3.64 | 2.57 | 2.8 |

EXAMPLES 8 AND 9

Effect of Second Co-catalyst

The effect of the second co-catalyst was considered in these examples. In Examples 8 and 9, propylene polymerizations were conducted in accordance with the procedure of Example 6. The catalyst of Example 2 was utilized. In addition, the first co-catalyst of Example 2, triethylaluminum, was used in these examples. However, the second co-catalyst of Example 2, IBTMS, was replaced in Examples 8 and 9 with a second co-catalyst, phenyl triethoxysilane (PES). In addition, the mole ratio of aluminum to titanium to the second co-catalyst (Al/Ti/ED) of Example 2, 40:1:8, was changed in Example 7 to 20:1:10 and in Example 8 to 20:1:2.5. Thus, Examples 8 and 9 differed from each other on the basis of the concentration of PES charged into the polymerization reactor.

The results of Examples 8 and 9 are tabulated in Table 2. For comparative purposes the polymerization experiment of Example 2 is included in Table 2.

Use of modifying compounds outside the scope of the catalyst of this invention, otherwise formed in accordance with the formation of the catalyst of Example 4, specifically 2-methyl-2-chloropropanol, phosphorus trichloride, benzoyl chloride, ethylchloroformate and trichloroethane of Comparative Examples 1, 2, 3, 4 and 5, respectively, all produced polypropylene which was deficient not only in productivity but, in addition, all produced polymers deficient in isotacticity, as manifested by percent heptane insolubles of less than 95%.

It is noted that all of these compounds, outside the scope of the modifying compounds of the catalyst of this invention, were, like the modifying compounds of the present invention, halides, specifically, chloride.

It is also emphasized that two compounds within the scope of the present invention, boron trichloride and aluminum trichloride, (Examples 10 and 11, respectively) produced excellent results in terms of their productivity and the properties of the polymer produced. Indeed, these results marginally exceeded those of Example 4, which differed from Examples 10 and 11 only

TABLE 3

| Catalyst of Example No. | Second Co-catalyst | Al/Ti/ED Mole Ratio | Productivity g PP/g Ti | g PP/g Total Cat. | % HI | MFR |
|---|---|---|---|---|---|---|
| 2 | IBTMS | 40/1/8 | 143,000 | 4575 | 96.4 | 2.5 |
| 8 | PES | 20/1/10 | 83,300 | 3450 | 87.8 | 4.6 |
| 9 | PES | 20/1/2.5 | 90,900 | 4700 | 87.8 | 1.3 |

EXAMPLES 10–11 AND COMPARATIVE EXAMPLES 1 TO 5

Effect of Silica Surface Modifying Compounds

The effect of silica surface modifying compounds was examined in these examples. In all of these examples the silica was pretreated with 1.25 mmols of hexamethyl disilazane (HMDS) per gram of silica, reflecting a level in so far as the silicon tetrachloride modifier of Example 4 was replaced with BCl₃ and AlCl₃.

All of these results are tabulated in Table 3. For comparative purposes Example 4 is included in that table because but for the differences in the surface modifying treatment of silica, all of the catalysts of these examples were prepared in accordance with Example 4.

TABLE 4

| Catalyst of Example No. | SiO₂ Treatment Agent | mmol of Treat. Agent/g SiO₂ | Wt % Ti | Wt % Mg | Productivity g PP/g Ti | g PP/g Total Cat. | % HI | MFR |
|---|---|---|---|---|---|---|---|---|
| 4 | SiCl₄ | 2.5 | 1.37 | 1.92 | 143,000 | 4,900 | 95.0 | 2.0 |
| 10 | BCl₃ | 3.3 | 2.89 | 3.88 | 250,000 | 5,250 | 96.4 | 2. |
| 11 | AlCl₃ | 3.24 | 3.71 | — | 250,000 | 5,425 | 95.9 | 1. |
| CE1 | 2-Methyl- | 2.5 | 2.57 | .96 | 16,700 | 221 | 85.0 | — |

TABLE 4-continued

| Catalyst of Example No. | SiO₂ Treatment Agent | mmol of Treat. Agent/g SiO₂ | Wt % Ti | Wt % Mg | Productivity g PP/g Ti | g PP/g Total Cat. | % HI | MFR |
|---|---|---|---|---|---|---|---|---|
| | 2-chloro-propanol | | | | | | | |
| CE2 | PCl₃ | 3.3 | 1.65 | 2.48 | 21,300 | 267 | 91.0 | — |
| CE3 | Benzoyl chloride | 10.0 | 2.48 | 2.74 | 111,000 | 1,822 | 80.9 | 6.0 |
| CE4 | Ethylchloroformate | 2.5 | 3.16 | 3.56 | 66,700 | 1,612 | 90.9 | 8.1 |
| CE5 | Trichloroethane | 2.5 | — | — | No product | | | |

EXAMPLE 12 AND COMPARATIVE EXAMPLE 6

Effect of the Solubility of Magnesium Compound

In these examples the criticality of a soluble magnesium source is emphasized. In Example 12 a mixed dialkoxy magnesium source, specifically, a mixture of C₅ to C₁₁ dialkoxymagnesium, was employed. It produced acceptable results, as established in Table 4, discussed below.

In Comparative Example 6 equal molar quantities of diethoxymagnesium was mixed with magnesium chloride, by comilling the solid magnesium chloride and the solid diethoxymagnesium. The resultant catalyst of Comparative Example 6, a solid, produced a catalyst having unacceptably low catalytic productivity, as well as very low isotacticity, as manifested by 78.4% heptane insolubles, and a melt flow rate too high to measure, indicative of a very low degree of polymerization.

These results are summarized in Table 4 which includes the results obtained for the catalyst of Example 1. The results obtained polymerizing propylene with the catalyst of Example 1 is reproduced since the catalysts of Example 12 and Comparative Example 6 were formed in accordance with the procedure of Example 1 except for the variation involving the use of the magnesium compound.

EXAMPLES 13 TO 15 AND COMPARATIVE EXAMPLE 7

Effect of Titanium Esters

These examples illustrate the importance of titanium esters on the formation of the catalyst of the present invention. In all of these examples the catalyst was formed in accordance with the procedure of Example 1 except for the step involving contacting the silica support with a titanium ester. In Examples 13 and 14, titanium tetrabutoxide and titanium tetranonolate, respectively, replaced the titanium ester of Example 1. The concentration of the esters of Examples 13 and 14 were identical with that of Example 1. In Example 15 the replacement titanium ester, tetra-2-ethylhexyltitanate, was used in substantially the same concentration. In all three examples the polypropylene product characteristics were acceptable albeit inferior to those obtained utilizing the catalyst of Example 1. Catalytic productivity of the catalysts of Examples 13 to 15 was inferior to the catalyst of Example 1 although within acceptable levels. In Comparative Example 7, the steps of treating the silica with a titanium ester was omitted. The catalyst of this example yielded a catalytic productivity too low for commercial acceptability.

The results of these examples, with the inclusion of Example 1 as a comparison, is summarized in Table 5.

TABLE 5

| Catalyst of Example No. | Mg Source | mmol Mg/g SiO₂ | Wt % Ti | Wt % Mg | Productivity g PP/g Ti | g PP/g Total Cat. | % HI | MFR |
|---|---|---|---|---|---|---|---|---|
| 1 | 2-Methylpentoxy magnesium chloride | 2.5 | 2.56 | 3.49 | 200,000 | 4,775 | -98.0 | 2.0 |
| 12 | Mixed C₅-C₁₂ branched dialkoxymagnesium | 2.5 | 6.50 | 5.15 | 143,000 | 5,700 | 94.9 | 1.3 |
| CE6 | Ethoxy* magnesium chloride | 2.5 | 3.80 | 2.95 | 41,700 | 1,125 | 78.4 | — |

*Prepared by extensive comilling of equal molar amounts of magnesium chloride and diethoxy magnesium. This material was a solid.

TABLE 6

| | | EFFECT OF TITANIUM ESTER COMPONENT | | | | | | |
|---|---|---|---|---|---|---|---|---|
| Catalyst of Example No. | Ti(OR)₄ | Conc. mmol/g | Wt % Ti | Wt % Mg | Productivity g PP/g Ti | g PP/g Total Cat. | % HI | MFR |
| 1 | Tetracresyl Titanate | .635 | 2.56 | 3.49 | 200,000 | 4775 | 98.0 | 2 |
| 13 | Titanium Tetrabutoxide | .635 | 2.15 | 3.57 | 90,900 | 1810 | 94.4 | 2 |
| 14 | Titanium Tetranonolate | .635 | 2.45 | 3.46 | 143,000 | 4342 | 95.2 | 3 |
| 15 | Tetra-2-ethyl | 0.64 | 2.34 | 3.45 | 125,000 | 1600 | 92.0 | 4 |

TABLE 6-continued

EFFECT OF TITANIUM ESTER COMPONENT

| Catalyst of Example No. | Ti(OR)$_4$ | Conc. mmol/g | Wt % Ti | Wt % Mg | Productivity g PP/g Ti | Productivity g PP/g Total Cat. | % HI | MFR |
| --- | --- | --- | --- | --- | --- | --- | --- | --- |
| CE7 | hexyltitanate None | — | 1.90 | 2.00 | 62,500 | 1187 | 92.7 | 3 |

COMPARATIVE EXAMPLE 8

Effect of Alumina Carrier

A catalyst was prepared in accordance with the procedure of Examples 1 and 2 but for the substitution of silica calcined at 600° C. in nitrogen with alumina calcined at 200° C. in nitrogen.

When this catalyst was employed in the polymerization of propylene in accordance with the procedure of Example 6 the catalytic activity was found to be 52,600 grams of polypropylene per gram of titanium, an unacceptable low value. Moreover, the degree of stereoregularity, manifested as the percent heptane insolubles, was only 90.7, far below the desirable 95% isotacticity, levels obtained using the catalysts within the scope of the present invention.

EXAMPLES 16 and 17

Effect of the Use of Internal Electron Donors

Examples 16 and 17 illustrate the effect of internal electron donors in the formation of catalysts within the contemplation of the present invention. In the two examples, the catalyst was prepared in accordance with the procedure utilized in the formation of the catalyst of Example 1. However in Examples 16 and 17, ethyl benzoate was used as an internal electron donor in the formation of the catalyst. In Example 16, 5.90 mmol of ethyl benzoate was introduced into the catalyst by being premixed with tetracresyl titanate. In Example 17, 2.98 mmol ethyl benzoate was introduced into the catalyst by being premixed with titanium tetrachloride.

Table 6 summarizes the results of these examples. Both of these examples employing an internal electron donor produced a satisfactory propylene polymerization catalyst albeit, not as effective as the more preferred embodiment of Example 1. The inclusion of Example 1, the catalyst of which was formed identically, but for the incorporation of an electron donor, in Table 6 establishes the quantitative superiority of the catalyst of Example 1 over those of Examples 16 and 17.

The above embodiments and examples are given to illustrate the scope and spirit of the instant invention. These embodiments and examples will make apparent, to those skilled in the art, other embodiments and examples. These other embodiments and examples are within the contemplation of the present invention. Therefore, the present invention should be limited only by the appended claims.

What is claimed is:

1. A catalyst precursor for reaction with a titanium halide to form a catalyst for the production of a stereospecific alpha olefin polymer comprising a silica support treated to reduce surface hydroxyl or silanol group content reacted with a magnesium compound selected from the group consisting of hydrocarbyloxy magnesium, hydrocarbyloxy magnesium halides, and mixtures thereof, further reacted with at least one titanium compound having the structural formula Ti(OR)$_n$X$_m$ where R is aryl, alkyl, alkaryl or mixtures thereof; X is halogen; n is an integer of 1 to 4; and m is 0 or an integer of 1 to 3 with the provision that the sum of n and m is 4, and thereafter reacted with a titanium halide with the proviso that the titanium halide is not the same as said titanium compound having the formula Ti(OR)$_n$X$_m$.

2. The catalyst precursor of claim 1 wherein the magnesium compound is an alkoxy magnesium halide.

3. The catalyst precursor of claim 2 wherein the titanium compound is a halogen free titanium alkoxide.

4. A catalytic precursor according to claim 3 wherein the silica support is contacted with a silicon halide, boron halide, aluminum halide, alkyl silicon halide or mixtures thereof, prior to interreaction with said titanium compound.

5. A catalytic precursor according to claim 1 wherein the silica support is calcined in an inert atmosphere or treated with a monofunctional organic silicon compound to provide said reduced SiOH content.

6. A catalytic precursor according to claim 5, wherein said monofunctional organic silicon compound is a hexaalkyl disilazane.

7. A catalytic precursor according to claim 1 wherein the silica has a surface area in the range of between about 80 and about 300 m$^2$/g, a median particle size of about 20 to 200 microns and a pore volume of between about 0.6 to about 3.0 cc/g.

8. A catalytic precursor according to claim 7 wherein the silica is pure silica, silica containing minor amounts of one or more of alumina, titania, zirconia, magnesia or mixtures thereof.

9. A catalytic precursor according to claim 3 wherein said titanium ester is tetracresyl titanate, titanium tetrastearate, titanium tetrabutoxide, titanium tetranonolate, tetra-2-ethylhexyltitanate, tetraisobutyltitanate, tetra-n-

TABLE 7

| Catalyst of Example No. | Internal E.D. Used | Conc. mmol. | Wt % Ti | Wt % Mg | Productivity g PP/g Ti | Productivity g PP/g Total Cat. | % HI | MFR |
| --- | --- | --- | --- | --- | --- | --- | --- | --- |
| 1 | None | — | 2.56 | 3.49 | 200,000 | 4,775 | 98.0 | 2.0 |
| 16 | Ethyl Benzoate[a] | 5.90 | 0.91 | 3.48 | 100,000 | 940 | 92.0 | 2.7 |
| 17 | Ethyl Benzoate[b] | 2.98 | 1.94 | 3.18 | 143,000 | 1,985 | 93.3 | — |

[a]Electron donor premixed with tetracresyl titanate.
[b]Electron donor premixed with titanium tetrachloride.

propyltitanate, tetraisopropyl titanate or mixtures oligomers or isomers thereof.

10. A supported catalyst for the polymerization of olefins to stereospecific polymers obtainable by reacting a modified silica support having a selective distribution of reactive hydroxyl groups with a magnesium compound reactive with said surface hydroxyl groups, optionally reacting the thus obtained product with a silicon halide, alkyl silicon halide, boron halide or aluminum halide, further reacting the so-produced first material with a tetra- substituted organo halogen-free titanium compound wherein the organic moiety sterically hinders accessability of said organo titanium compound to the reactive sites on the modified silica support and thereafter reacting the so-produced second material with a titanium halide.

* * * * *